3,377,323
METHOD FOR PULVERIZING POLYMERS
Akira Ioka, Kawasaki-shi, Tsuneyuki Kato, Tokyo, and Yutaka Toyoda, Kawasaki-shi, Japan, assignors to Asahi Kasei Kogyo Kabushiki Kaisha, Osaka, Japan, a corporation of Japan
No Drawing. Filed June 10, 1964, Ser. No. 374,173
Claims priority, application Japan, June 11, 1963, 38/29,917
3 Claims. (Cl. 260—78)

This invention relates to a method for pulverizing polymers. More particularly, this invention relates to a method for pulverizing polymers without using any organic solvent.

Plastic powder molding and plastic powder lining have recently been put in extensive use as comparable with general methods for molding and lining of plastics. That is, in the field of molding, such advantages are obtained by the use of powders that the time required for molding can be reduced and foamed plastics usable for cushions and the like can also be produced by simultaneous use of a foaming agent in plastics, and furthermore, hollow plastic products can be manufactured, as well known. In the aspect of lining, it is also well-known that plastic powders can be sprayed and fused on the surfaces to be subjected to lining by means of electrostatic painting and the like.

With the increase of the demand for plastic powders, a number of methods for the production thereof have been proposed, but no satisfactory method has been found yet. As examples of the methods for producing powdered polyamide resin which is one of the plastics used extensively, the following can be cited; one method comprises dissolving polyamide in a methanolic solution of calcium chloride, adding water to said solution to separate powders, and filtering said powders to obtain desired products; a further method comprises dissolving polyamide resins in an autoclave at high temperatures using methanol as a solvent, and cooling the resins to separate and filter powders; still another method comprises dissolving polyamide in a mixture consisting of water, alcohol and dimethylformamide (10:30:60) at high temperatures, and cooling the solution to separate and filter the powders.

In carrying out these methods, various inconveniences and defects take place; for example, in the case of the first methods, calcium chloride tends to mix in the products, and hence it is required to wash the resin powders produced, and in the case of the second and third methods, the recovery of solvents must be effected in carrying out these methods industrially.

An object of this invention is to provide a method for economically producing resin powders having a uniform grain size free from impurities.

Another object of this invention is to provide a method for producing resin powders free from the deficiencies in the known methods.

As the result of thorough research, the inventors discovered that these objects can be favorably accomplished by treating the raw material polymers with water at high temperatures under pressure, and cooling the contents or spraying the same while heated through a nozzle.

According to the present invention, adhesion of salts such as calcium chloride or organic solvents such as alcohols is not overcome. Accordingly, there is no need to wash the powders obtained or to eliminate or recover the solvents therefrom. Also such phenomena as decomposition, coloring of polymers to be treated, and the like, are negligible and the grain size of the product powders is substantially uniform.

The present invention will be further illustrated hereunder.

The polymers adapted to be used in the present invention are all insoluble in water in the range of ordinary temperature to the boiling point of water and have a value of so-called solubility parameter of greater than 10. The value of solubility parameter (hereinafter referred to as S.P.) can be obtained in various manners such as by calculation from physical constants of known organic substances or by direct measurement. As typical methods the following can be cited: one is the evaporation energy method obtaining said value by calculating the cohesive energy density; another is the Hildebrand method (J. Hildebrand, R. Scott, "The Solubility of Nonelectrolytes"); still another is a method for inferring the value from molecular structure and density (S. A. Small; J. Appl. Chem., vol. 3, p. 71–80; February 1953); and still another is to obtain the value from solubility or swelling. The values of S.P. of typical polymers obtained by Small's method are shown in Table 1.

Polymers adapted to be used in the present invention are as follows: polymethacrylates such as polymethylmethacrylate, polyacrylonitrile, thermo-plastic polyesters such as polyethylene terephthalate, polyamides such as polycaproamide ("6-nylon"), and copolymers consisting mainly of monomers constituting the aforesaid polymers and having a value of S.P. above 10, such as acrylonitrile-methylacrylate copolymer (e.g. 90:10). Polyamides especially may be applied to the present invention in wide range; for example, polyhexamethylene adipamide ("66-nylon"), polyaminoundecanic acid, polyaminoenanthlic acid, polypyrolidone, polypiperydone, polyhexamethylene diamine, and the like.

TABLE 1.—S.P. AND MELTING POINT OF THE POLYMER

| Polymer | S.P. | Melting point (° C.) |
|---|---|---|
| Polyethylene | 8.1 | 104 |
| Polystyrene | 9.12 | 230–233 |
| Polymethylmethacrylate | 9.25 | 160 |
| Polyvinyl chloride | 9.6 | 220 |
| Polyester ("Tetron') | 10.7 | 230 |
| Polyacrylonitrile | 12.75 | Above 85 |
| Polyamide ('6-nylon') | 13.5 | 215 |
| Water | 23.41 | 100 |

In applying these polymers to the present method, polymers having any shape and size such as pellet, fiber and the like may be utilized. When these polymers are charged into an autoclave together with water, and heated with stirring, they are suspended (dissolved) in the water at certain elevated temperatures below the melting points of the respective polymers. When the treating temperature is raised, the velocity of suspension (dissolution) of the polymers in the water increases, and hence the time of treatment is reduced. However, with an increase in the treating temperature, it is not only necessary to construct the autoclave robustly, but there is also the unfavorable possibility that decomposition and coloring of polymers may take place. Accordingly, the treating temperature is subjected to restriction. The maximum treating temperature is ordinarily in the vicinity of the melting points of the respective polymers. Generally, the treating time is in the range of 0.5 to 1.5 hours.

The temperature for the polymers to commence to suspend (dissolve) in water in the present invention, varies slightly depending on the kind of polymer. For example, it is about 155° C. for polyamides, about 170° C. for polyesters and about 160° C. for polyacrylonitrile.

In this manner polymers suspended (dissolved) in water are filtered and dried, if desired, after being cooled, or sprayed from the autoclave through a nozzle at high temperature and high pressure. The powder thus obtained have very uniform grain sizes and the majority are in the range between about 1μ to 10μ. It may be considered that suspension (dissolution) of the polymers respectively in the present invention has relation to the polar functional groups contained in the polymers. That is, these polymers are crystalline at room temperature, but when heated, the molecular motion thereof gradually becomes more vigorous and at a definite temperature, for example, in the vicinity of about 155° C. in the case of polyamide, the molecular motion energy approaches the bonding energy between polymer molecules. At this time, solvent molecules penetrate into the thusly loosened polymer structure, and hence it is considered that these polymers swell and suspend (dissolve). At a particular temperature for the respective polymers, these polymers actually suspend (dissolve) in any amount in water, so that the solubilities of the polymers at a certain temperature are not present. In carrying out the present invention, however, it is preferable to limit the ratio of polymer to water to a maximum of 1:1 (by weight) in the case of obtaining powders by discharging the contents through a nozzle while heated. According to the present invention, as illustrated in the foregoing, water is employed as the solvent, and hence it is not required to wash the products and recover any solvents, and also no chemical change occurs in the products. In this manner, it is possible to obtain very economically polymer powders having uniform grain size by simple operations. The reason for the use of the term "suspend (dissolve)" in the present specification is that it is impossible to establish whether the polymer is completely dissolved in water under the pressure and temperature employed in the present invention or partially suspended in water without complete dissolution. In any event, it is unquestionable that large particles of polymers can be formed into finely divided powders by applying the present method to the polymers as specified herein. Accordingly, the recitation of a temperature sufficient to suspend (dissolve) said polymer in water implies such a temperature at which finely divided powders can be obtained as a product by treating the large particles of polymer in water and cooling the resulting solution.

In the case of applying the present invention to polymers having a value of S.P. below 10, as shown in the following experimental results, even at temperatures higher than the melting points, suspension (dissolution) of the polymers in water is not obtained. That is, at temperatures higher than the melting points, the polymers dissolve in water but when separated from the water, and cooled, form a mass. Accordingly, it is utterly impossible to spray the polymers while heated.

Experiment 1.—Treatment of polyethylene resins

Polyethylene used: polyethylene manufactured by Dow Chemical Co. (U.S.A.)
Melt index, 20/10 min.
Degree of polymerization, about 20,000.
Results:

| Treating temperature. (° C.) | Water (g.) | Polyethylene (g.) | Treating time (hr.) | Dissolution (suspension) in water |
|---|---|---|---|---|
| 90–94 | 300 | 20 | 1 | No suspension. |
| 100–104 | 300 | 20 | 1 | Molten, but not suspended. |

(1) At temperatures below 90°–94° C., no suspension (dissolution) occurs.
(2) At temperatures above 100° to 104° C. the polymer melts, but is never dissolved in water, as seen for polyesters and polyamides. It was impossible, therefore, to spray and pulverize them.

Experiment 2.—Treatment of polyvinyl chloride resins

Polyvinyl chloride resin used: Rigid polyvinyl chloride resin.

Results:

| Kind of PVC | Treating temperature (° C.) | Water (g.) | PVC (g.) | Suspension |
|---|---|---|---|---|
| Hard | 150 | 300 | 20 | No. |
|  | 220 | 300 | 20 | No, degraded. |

Polyvinyl chloride resin does not dissolve at 220° C., but the high temperature of 220° C. causes elimination of hydrogen chloride, and degradation takes place in the resin. Therefore, the present process is impossible to be applied to PVC.

The following examples will serve to illustrate the present invention but are not intended to limit the scope of the invention.

Example 1

Fifteen grams of 6-nylon (cylindrical shaped pellets: 2 mm. diameter, 2 mm. height) were charged in an autoclave with 300 g. of water, heated and stirred at 160° C. under pressure of 6.1 kg/cm.$^2$ for one hour. Thereafter, the mixture was discharged through a nozzle by the use of compressed air at a pressure of 7 kg./cm.$^2$ and then dried. Polyamide resin powders having grain size of $1\mu$ to $2\mu$ wer obtained.

Example 2

Thirty grams of 6-nylon pellets were charged in an autoclave with 300 g. of water, heated and stirred at 180° C. under pressure of 9.9 kg./cm.$^2$ for 30 minutes, thereafter, the mixture was spray-dried by the same manner as described in Example 1. Resin powders of 6-nylon having grain size of $1\mu$ to $2\mu$ were obtained.

Example 3

Three hundred grams of 6-nylon pellets were charged in an autoclave with 300 g. of water, heated and stirred at 180° C. under pressure of 9.9 kg./cm.$^2$ for one hour. Thereafter, the mixture was treated in the same manner as in Example 1. Resin powders of 6-nylon having a grain size of $1\mu$ to $2\mu$ were obtained.

Example 4

Treatment was carried out in the same manner as in Example 3 except using Tetron fiber (polyethylene terephthalate) as polyester in the place of 6-nylon pellet to obtain polyester resin powders having an average grain size of $5\mu$.

Example 5

Treatment was carried out in the same manner as in Example 4 except by cooling the solution to be treated instead of spraying and drying to obtain a concentrated aqueous suspension of polyester resin powders having a grain size of $1\mu$ to $10\mu$.

Example 6

Treatment was carried out at 170° C. in the same manner as in Example 1 except using polyacrylonitrile fiber in place of 6-nylon to obtain powders having an average grain size of $5\mu$.

Example 7

Treatment was carried out at 170° C. in the same manner as in Example 1 except using an acrylonitrile-methylacrylate (80:10) copolymer fiber in place of 6-nylon to obtain resin powders of acrylonitrile-methylacrylate copolymer having an average grain size of $5\mu$.

Example 8

Treatment was carried out at 180° C. in the same manner as in Example 1 except using 15 g. of 6-nylon and 15 g. of Tetron (polyethylene terephthalate) in the place of 6-nylon to obtain mixed powders of 6-nylon and Tetron having an average grain size of $5\mu$.

Example 9

Treatment was carried out in the same manner as in Example 1 except using 15 g. of 6-nylon and 15 g. of polyacrylonitrile at 170° C. to obtain mixed powders of 6-nylon and polyacrylonitrile having an average grain size of 5µ.

Example 10

Treatment was carried out in the same manner as Example 1 except using 15 g. of Tetron (polyethylenephthalate) 15 g. of acrylonitrile-methylacrylate (90:10) copolymer at 180° C. to obtain mixed powders of Tetron and acrylonitrile-methylacrylate copolymer having an average grain size of 5µ.

What we claim is:

1. A method for particularizing polymers comprising heating a mass which is insoluble in water at temperatures up to the boiling point of water at normal pressure in an autoclave solely in the presence of water in an amount at least equal in weight to that of said polymer, the polymer having a solubility parameter in water of at least 10, the temperature in the autoclave being less than the melting point of the polymer and at least 155° C. to dissolve said polymer in water, and then spraying the contents of the autoclave under pressure, through a nozzle, while heated to obtain the polymer in powder state.

2. A method as claimed in claim 1 wherein the polymers are polyamides.

3. A method as claimed in claim 2 wherein said polyamides are polycaproamide, polyhexamethylene azipamide, polyaminoundecanic acid, polyaminoenthlic acid, polypyrrolidone, polypiperidone, or polyhexamethylene diamine.

References Cited

UNITED STATES PATENTS

| 3,042,970 | 7/1962 | Terenzi | 260—96 |
| 2,742,440 | 4/1956 | Stott et al. | 260—287 |

FOREIGN PATENTS 942,691  11/1963  Great Britain.

WILLIAM H. SHORT, *Primary Examiner.*

R. T. LYON, *Assistant Examiner.*